(12) United States Patent
Kobayashi et al.

(10) Patent No.: US 7,150,264 B2
(45) Date of Patent: Dec. 19, 2006

(54) CONTROL DEVICE FOR INTERNAL COMBUSTION ENGINE

(75) Inventors: Kazuo Kobayashi, Nagoya (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/012,328

(22) Filed: Dec. 16, 2004

(65) Prior Publication Data

US 2005/0139193 A1    Jun. 30, 2005

(30) Foreign Application Priority Data

Dec. 25, 2003    (JP)    ............................. 2003-430781

(51) Int. Cl.
*F02D 31/00*    (2006.01)
*F02M 25/07*    (2006.01)

(52) U.S. Cl. ................................. 123/376; 123/568.21

(58) Field of Classification Search ................ 123/376, 123/568.21

See application file for complete search history.

(56) References Cited

U.S. PATENT DOCUMENTS

| | | | |
|---|---|---|---|
| 6,016,788 A | * | 1/2000 | Kibe et al. .................. 123/399 |
| 6,502,556 B1 | * | 1/2003 | Wienand et al. ............. 123/478 |
| 6,622,704 B1 | * | 9/2003 | Wienand et al. ............. 123/478 |
| 2003/0101974 A1 | * | 6/2003 | Wienand et al. ........ 123/568.12 |
| 2003/0188727 A1 | | 10/2003 | Van Nieuwstadt |
| 2003/0192517 A1 | | 10/2003 | Gates et al. |
| 2004/0206074 A1 | * | 10/2004 | Akao et al. .................... 60/324 |

FOREIGN PATENT DOCUMENTS

JP    2001-090580    3/2001

OTHER PUBLICATIONS

Patent Abstracts of Japan, vol. 011, No. 397, Dec. 25, 1987, & JP 62 1627i63 A (Toyota motor corp.), Jul. 18, 1987.

* cited by examiner

*Primary Examiner*—John T. Kwon
(74) *Attorney, Agent, or Firm*—Nixon & Vanderhye, P.C.

(57) ABSTRACT

Deterioration of emission is restrained even if the actual control condition including the required torque is different from the set control condition. An ECU establishes a control amount of an EGR valve in such a manner that a condition amount, which is a control parameter controlling the EGR valve, is established as a target value. The ECU selects the condition amount as the control parameter among a fresh-air amount, an exhaust oxygen concentration, and an intake oxygen concentration, in which an operation amount of the EGR valve is minimum.

10 Claims, 12 Drawing Sheets

CONTROL DEVICE FOR INTERNAL COMBUSTION ENGINE

CROSS-REFERENCE TO RELATED APPLICATION

This application is based on Japanese Patent application No. 2003-430781 filed on Dec. 25, 2003, the disclosure of which is incorporated herein by reference.

FIELD OF THE INVENTION

The present invention relates to a control device for an internal combustion engine.

BACKGROUND OF THE INVENTION

A control device for an internal combustion engine controls parts of the internal combustion engine, such as an injector, and adjusts opening/closing timing of an injector on which an injection timing of fuel and an amount of the fuel are determined. The control unit of the control device determines the fuel injection timing and the amount of the fuel based on the stepped value of an accelerator and a detected result of the operation condition of the internal combustion engine. In order to burn the fuel properly, the amount of gas is controlled by a gas adjusting means such as an intake throttle valve and an EGR valve to make a mixture gas with the fuel.

The control of the gas adjusting means is executed by detecting the condition amount of the engine condition which is varied according to the operation amount of the gas adjusting means, and establishing the operation amount of the gas adjusting means in such manner that the detected condition amount is consistent with the target value. The target value of the condition amount is established in such a manner that an emission level is restricted under a predetermined level. In the control unit, the relationship between the control condition including a required torque and a target value of the condition amount is stored in a map. An exhaust oxygen concentration, an amount of fresh-air, an intake oxygen concentration, and an intake air pressure are used as the condition amount.

To reduce the emission, a high-pressure injection and a multi injection is developing. However, these injections have following problems. That is, because the higher-pressure injection causes a shorter period of injection, the error of injection timing dominates in the error of the injected fuel amount. In the multi injection, a sum of injected fuel amount from each injector corresponds to an injected fuel amount in a power stroke. Since the number of injection is increased, the error in each injector is accumulated. As a result, the target condition amount corresponding to the required torque becomes different from a condition amount corresponding to an actually generated torque, by which the emission deteriorates. JP-2001-90580 A discloses a system in which a time lag from the time of activating the injector to the time of opening the injector is derived from a learning injection, then the time lag is reflected to a length and output timing of a driving pulse which controls the fuel injection period.

The system disclosed in JP-2001-90580 A 1 is desirable in averaging a characteristic of the injector. However, an operational dispersion of the injector is not concerned. FIG. 19 shows a characteristic of a target fresh-air amount relative to the required torque. The target fresh-air amount GA_TRG is not constant and varies according to the required torque T. A line fGA (NE, T) represents the target fresh-air amount GA_TRG in the engine condition (NE, T). Thus, when the required torque T0 disperses in a range in which the actual injected fuel amount generates the torque T0±ΔT, the proper target fresh-air amount GA_TRG deviates from GA_TRG0 (=fGA (NE, T0)) according to the dispersion of the injected fuel amount. If the deviation ΔGA_TRG uniformly varies, the deviation ΔGA_TRG can be estimated as |fGA(NE, T0+ΔT)−fGA(NE, T0−ΔT)|. The fresh-air amount can be converted in to EGR ratio as shown in FIG. 20. If the fresh-air amount which is necessary for the actual injected fuel amount deviates from GA_TRG0, a deviation AEGR is generated between the EGR ratio EGR0 converted by setting the target fresh-air amount as GA_TRG0 and a EGR ratio suitable for the actual injected fuel amount. As the result, the emission level can be deteriorated rather than the predetermined level.

SUMMARY OF THE INVENTION

The present invention is made in view of the foregoing matter and it is an object of the present invention to provide a control device for an internal combustion engine, which is capable of restricting the emission effectively.

The present invention is based on inventor's findings that a deviation of the operation amount of a gas adjusting means varies according to the kind of operation amount used in gas adjusting control.

According to the present invention, a control device for an internal combustion engine includes a gas adjusting means for adjusting a gas which makes a mixture gas with an injected fuel, a gas adjust depending condition amount detecting means for detecting a condition amount indicating an engine condition which varies according to an operation amount of the gas adjusting means.

The control device further includes a gas adjust controlling means for conducting a gas adjust control in which an operation amount of the gas adjusting means is established in such a manner that the detected condition amount is turned to a target value which is established with respect to a current control condition including a required torque.

The gas adjust depending condition amount detecting means includes a plurality of gas adjust depending condition amount detecting means which detect different kinds of condition amounts. The gas adjust controlling means changes the gas adjust control based on one kind of condition amounts into the gas adjust control based on the other kind of condition amounts.

Thus, even if the operation of parts of the internal combustion engine has an error relative to the control condition, the gas adjust controlling means changes the gas adjust control to the other gas control condition. The former gas adjust control is based on one kind of condition amounts of which deviation of operation amount is relative large. The latter gas adjust control is based on the other kind of condition amounts of which deviation of operation amount is relative small. The deviation of the operation amount of gas adjusting means based on a target condition amount is decreased to restrict the emission at a minimum.

BRIEF DESCRIPTION OF THE DRAWINGS

Other objects, feature and advantages of the present invention will become more apparent from the following detailed description made with reference to the accompanying drawings, in which like parts are designated by like reference numbers an in which.

DETAILED DESCRIPTION OF EMBODIMENTS

Embodiments of the present invention will be described hereinafter with reference to the drawings.

First Embodiment

Figure 1:
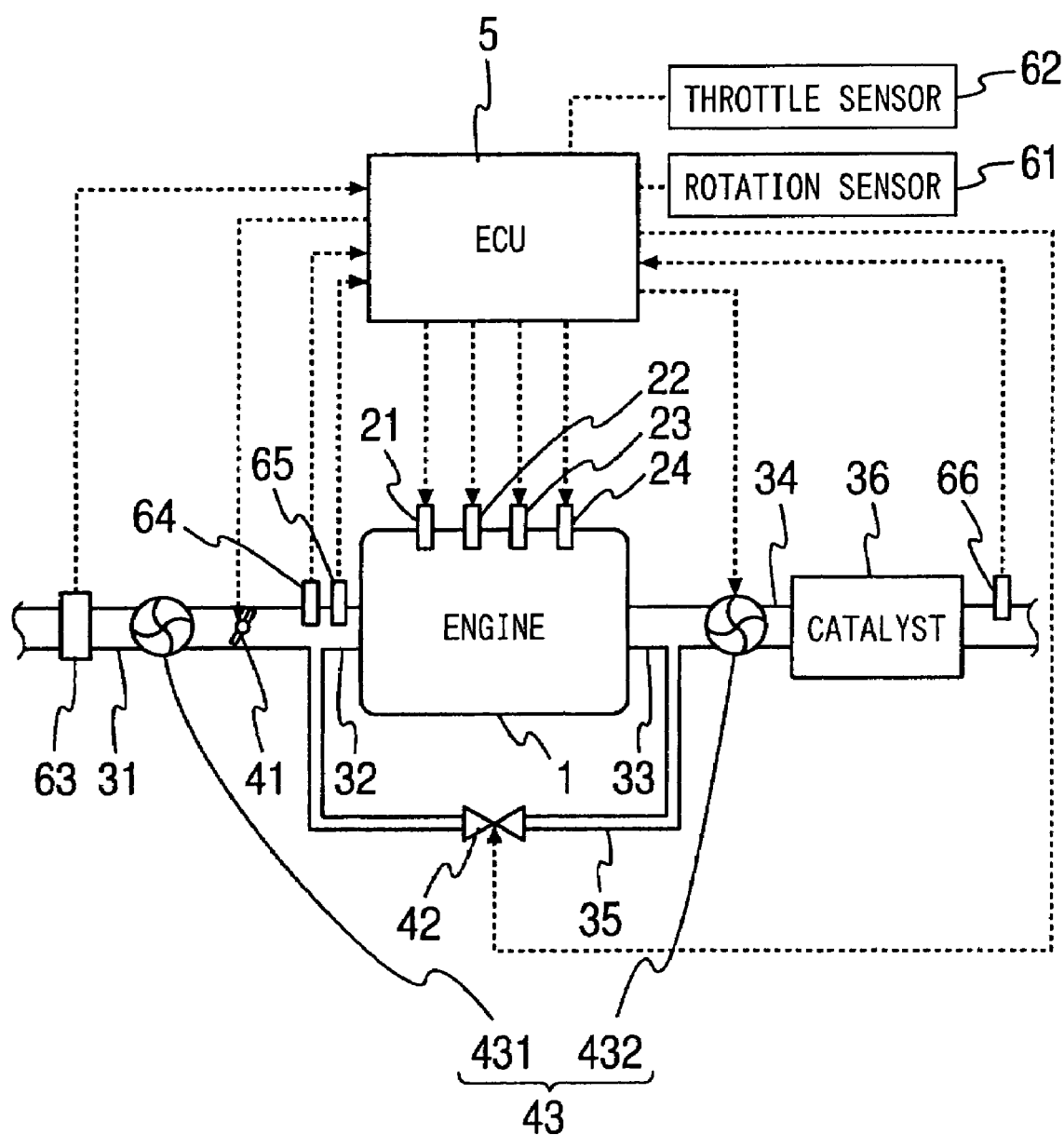
FIG. 1 is a schematic view of a diesel engine provided with a control devise according to a first embodiment.
Figure 2:
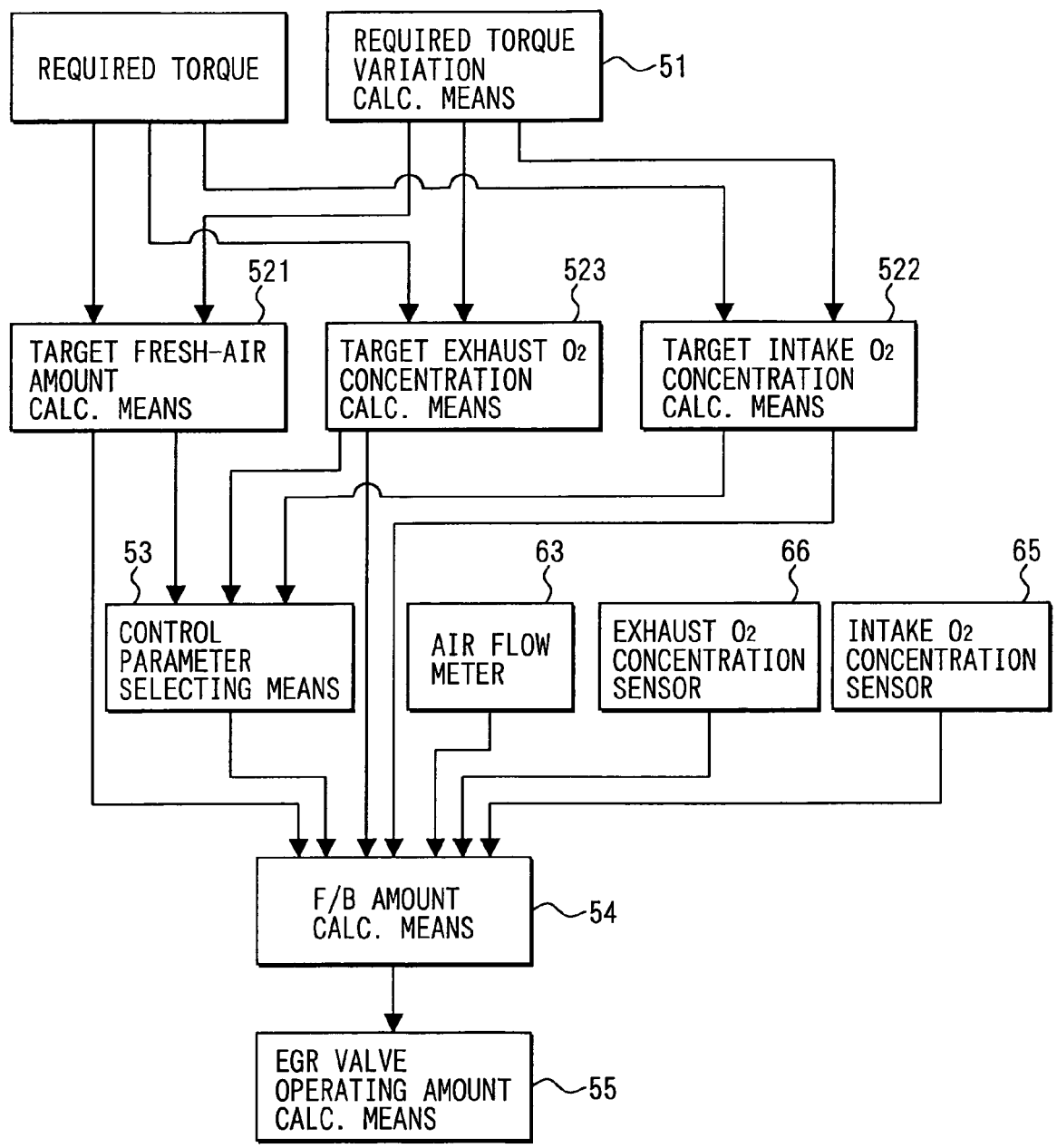
FIG. 2 is a block chart showing an essential part of functions executed by an ECU.

FIG. 1 and FIG. 2 illustrate a construction of diesel engine for an automobile, which is simply referred to as an engine hereinafter. The engine 1 is a compression igniting internal combustion engine equipped with a fuel control device of the present invention. The engine 1 having a plurality of cylinders is provided with injectors 21, 22, 23, 24, which respectively correspond to each cylinder. Each of the injectors 21, 22, 23, 24 is opened to inject a fuel in a predetermined timing during a predetermined period. The fuel is supplied to each injector 21–24 from a common rail. The exhaust gas of the burned fuel is discharged into the atmosphere through an exhaust manifold 33, which communicates with each cylinder at upstream portion, and through an exhaust pipe 34 provided with a catalyst 36. The engine 1 is a conventional one, which is provided with intake valves and exhaust valves (not shown) in each cylinder.

A gas producing an air-fuel mixture with fuel is supplied from an intake manifold 32. The intake manifold 32 communicates with an intake pipe 31 to intake a fresh-air. An EGR pipe 35 recycling a part of exhaust gas is connected between the intake manifold 32 and the exhaust manifold 33. The gas supplied to each cylinder includes the exhaust gas adding the fresh-air. An amount of recycling exhaust gas, which corresponds to an EGR rate, is controlled by an EGR valve 42. The intake pipe 31 is provided with an intake throttle valve 41, which adjusts an amount of fresh-air. A turbocharger 43 is also provided in the intake manifold 32 and the exhaust manifold 33, which forcibly intake the fresh-air by utilizing the exhaust gas. The turbocharger 43 comprises a compressor 431 in the intake pipe 31 and a turbine 432 in the exhaust pipe 34. The turbine 432 drives the compressor 431. A capacity of supercharging of the turbocharger 43 is variable. The turbocharger 43 is referred to as a variable turbo 43 herein after.

A electrical control unit (ECU) 5 executes the control of the injectors 21–24 based on the engine condition sensed by sensors mounted on the engine, such as a engine speed sensor 61, a throttle position sensor 62 detecting an opening degree of the intake throttle valve 41, an air flow meter 63 detecting an amount of fresh-air. The intake manifold 32 is provided with an intake air pressure sensor 64 detecting an intake air pressure, an intake oxygen concentration sensor 65 detecting an oxygen concentration in the fresh-air, an exhaust oxygen concentration sensor 66 detecting an oxygen concentration in the exhaust gas. The common rail is provided with a pressure sensor detecting a fuel pressure in the common rail and a fuel pressure in the injectors 21–24. The engine is provided with other conventional sensors. The control of the EGR valve 42 executed by the ECU 5 is described hereinafter. The amount of fresh-air, the intake oxygen concentration, and exhaust oxygen concentration are used as control parameter to determined the EGR rate of the EGR valve 42 in such a manner that the detected value is turned to a target value. The target value of the parameter is determined based on the map in which a relationship between the required torque and the target value is stored.

The ECU 5 includes a target fresh-air mount calculating means 521 for calculating a target value of fresh-air mount, a target intake oxygen concentration calculating means 522, and a target exhaust oxygen concentration calculation means 523. The engine speed NE and the required torque T are input into each of the above means. The required torque variation $\Delta T$ is calculated in a required torque variation calculating means to be input to the above means. The required torque variation $\Delta T$ is a variation amount of the required torque corresponding to dispersion of torque due to an operational dispersion of the injectors 21–24. The required torque variation $\Delta T$ is estimated according to the engine condition as described below in detail.

The target values calculated by the target fresh-air mount calculating means 521, the target intake oxygen concentration calculating means 522, and the target exhaust oxygen concentration calculation means 523 are respectively input in a feedback amount calculation means 54. The fresh-air mount detected airflow meter 63, the intake oxygen concentration detected by the intake oxygen concentration sensor 65, and exhaust oxygen concentration detected by the exhaust oxygen concentration sensor 66 are input into the feedback amount calculation means 54. The feedback amount is calculated based on the deviations between the detected fresh-air amount and the target value, between the detected intake oxygen concentration and the target value, and between the detected exhaust oxygen concentration and the target value. The calculation of the feed back amount is executed on one of the fresh-air amount, the intake oxygen concentration, and the exhaust oxygen concentration. An EGR valve operating amount calculating means 55 calculates an operating amount of the EGR valve 42 based on the feedback amount. The calculation of the feedback amount is executed by the PID control or the modern control theory.

In the feedback amount calculation means 54, a feedback amount can be calculated with respect to the above three kind of condition amounts as the control parameters of the EGR valve 42. A control parameter selecting means 53 select one parameter which is effective. The control parameter selecting means 53 selects a control parameter of EGR valve 42 out of the fresh-air amount, the intake oxygen concentration, and the exhaust oxygen concentration based on the target fresh-air amount, the target intake oxygen concentration, and the target exhaust oxygen concentration.

Figure 3:
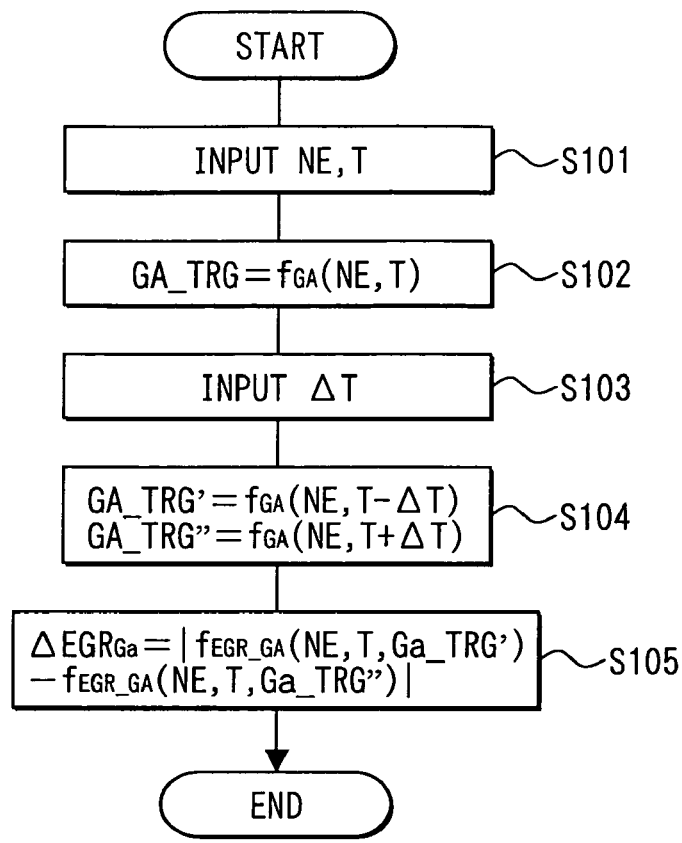
FIG. 3 is a first flowchart for explaining essential part of the control functions.
Figure 4:
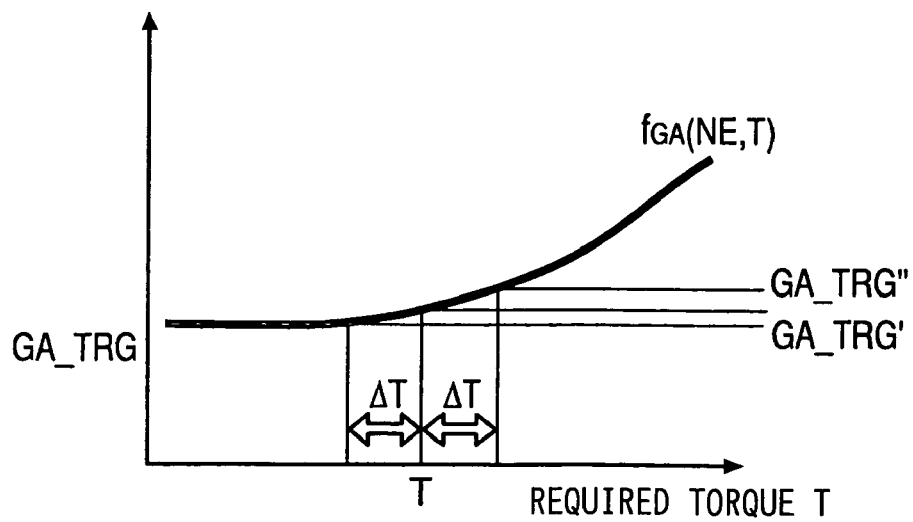
FIG. 4 is a first graph for explaining essential part of the control functions.

A procedure executed by the target fresh-air mount calculating means 521 is shown in FIG. 3. In step S301, a current engine speed NE and a require torque T are read. In step S102, a target fresh-air amount GA_TRG is calculated based on the engine speed NE and the required torque T which are read in step S101 (Equation 1). The target fresh-air amount calculated based on the engine speed "ne" and the required torque "t" is represented by fGA (ne, t). FIG. 4 shows a characteristic of the target fresh-air amount GA_TRG relative to the required torque T.

$$GA\_TRG = fGA(NE, T) \quad (1)$$

In step S103, a required torque variation $\Delta T$ is read.

In step S104, a hypothetical target value calculating means calculates a target fresh-air amount GA_TRG' when the engine condition (ne, t) is an engine condition (NE, T−$\Delta T$), and a target fresh-air amount GA_TRG" when the engine condition (ne, t) is an engine condition (NE, T+GA_TRG") (Equation 2-1, 2-2). GA_TRG' and GA_TRG" are hypothetical target fresh-air amount when the torque T is changed by $\Delta T$.

$$GA\_TRG' = fGA(NE, T-\Delta T) \quad (2-1)$$

$$GA\_TRG'' = fGA(NE, T+\Delta T) \quad (2-2)$$

Figure 5:
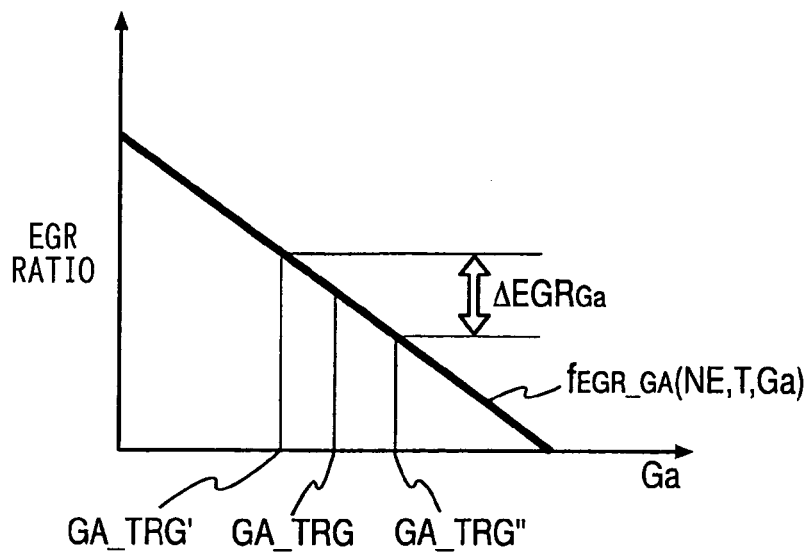
FIG. 5 is a second graph for explaining essential part of the control functions.

In step S105, a hypothetical operation amount dispersion calculating means calculates an EGR ratio deviation $\Delta EGRGa$, which is referred to as an EGR deviation hereinafter (Equation 3). The EGR deviation $\Delta EGRGa$ is a dispersion of hypothetical EGR ratio when the required torque is varied in a range of $\pm\Delta T$ with the fresh-air amount being used as the control parameter for the EGR valve. When the EGR ratio EGRGa is calculated based on the engine speed "ne", the required torque "t", and the fresh-air amount "ga", it is represented by fEGR_GA (ne, t, ga). The conventional calculation method, such as a map, can be used to calculate. FIG. 5 shows a characteristic of the EGR ratio EGRGa relative to the fresh-air amount Ga. After the EGR ratio EGRGa is calculated, the routine ends. The target fresh-air amount GA_TRG calculated in step S102 is output to the feedback amount calculation means 54. The EGR deviation $\Delta EGRGa$ calculated in step S105 is output to the control parameter selecting means 53.

$$\Delta EGRGa = |fEGR\_GA(NE, T, GA\_TRG') - fEGR\_GA(NE, T, GA\_TRG'')| \quad (3)$$

Figure 6:
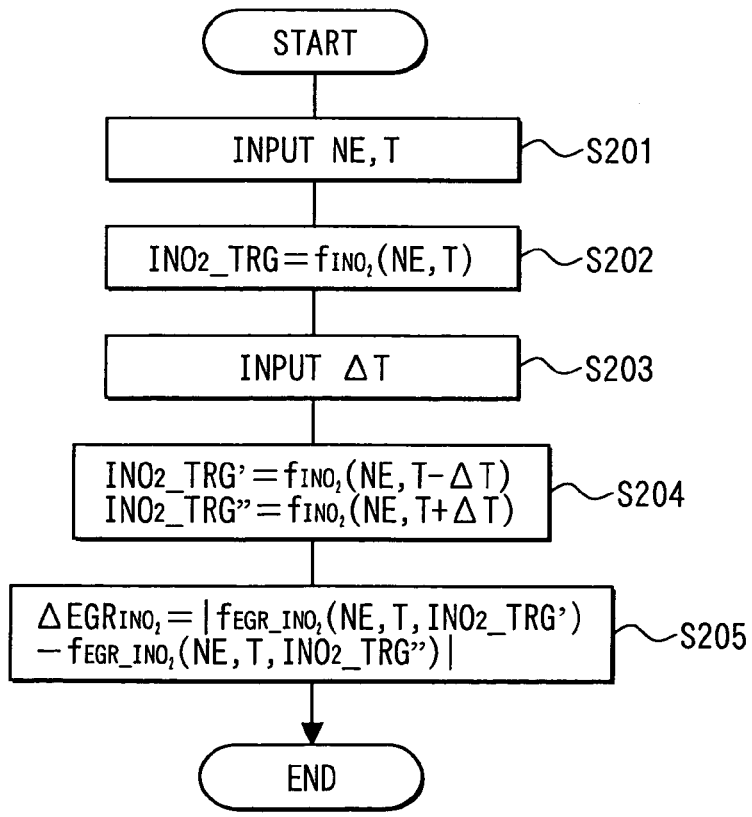
FIG. 6 is a second flowchart for explaining essential part of the control functions.
Figure 7:
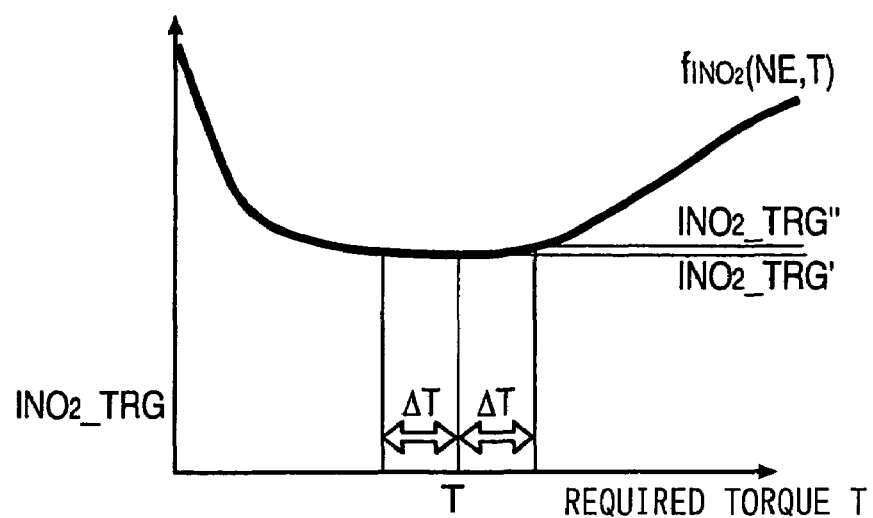
FIG. 7 is a third graph for explaining essential part of the control functions.

The procedure executed by a target intake oxygen concentration calculating means 522 is shown in FIG. 6. In step S201, the current engine speed NE and required torque T are read. In step S202, a target intake oxygen concentration INO2_TRG is calculated based on the engine speed NE and the required torque T read in step S201 (Equation 4). The target intake oxygen concentration calculated based on the engine speed "ne" and the required torque "t" is represented by fINO2 (ne, t). The conventional calculation method, such as a map, can be used to calculate. FIG. 7 shows a characteristic of the target intake oxygen concentration INO2_TRG relative to the required torque T.

$$INO2\_TRG = fINO2(NE, T) \quad (4)$$

In step S203, the required torque variation $\Delta T$ is read. In step S204, the hypothetical target value calculation means calculates the target intake oxygen concentration INO2_TRG' in case of the engine condition (NE, T−$\Delta T$) and the target intake oxygen concentration INO2_TRG" in case of the engine condition (NE, T+$\Delta T$) (Equation 5-1, 5-2). INO2_TRG' and INO2_TRG" are hypothetical target intake oxygen concentration when the torque T is changed by $\Delta T$.

$$INO2\_TRG' = fINO2(NE, T-\Delta T) \quad (5-1)$$

$$INO2\_TRG'' = fINO2(NE, T+\Delta T) \quad (5-2)$$

Figure 8:
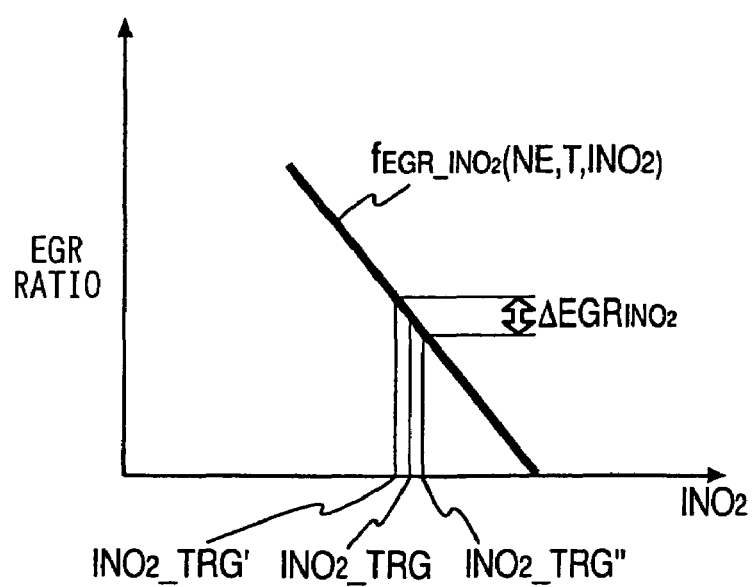
FIG. 8 is a fourth graph for explaining essential part of the control functions.

In step S205, a hypothetical operation amount dispersion calculation means calculates the EGR deviation $\Delta EGRINO2$ (Equation 6). The EGR deviation $\Delta EGRINO2$ is a dispersion of hypothetical EGR ratio when the required torque is varied in a range of $\pm\Delta T$ with the intake oxygen concentration being used as the control parameter for the EGR valve. When the EGR ratio EGRINO2 is calculated based on the engine speed "ne", the required torque "t", and the intake oxygen concentration "ino2", it is represented by fEGR_INO2 (ne, t, ino2). The conventional calculation method, such as a map, can be used to calculate. FIG. 8 shows a characteristic of the EGR ratio EGRINO2 relative to the intake oxygen concentration INO2. After the EGR ratio EGRINO2 is calculated, the routine ends. The target intake oxygen concentration INO2_TRG calculated in step S202 is output to the feedback amount calculation means 54. The EGR deviation $\Delta EGRINO2$ calculated in step S205 is output to the control parameter selecting means 53.

$$\Delta EGRINO2 = |fEGR\_INO2(NE, T, INO2\_TRG') - fEGR\_INO2(NE, T, INO2\_TRG'')| \quad (6)$$

Figure 9:
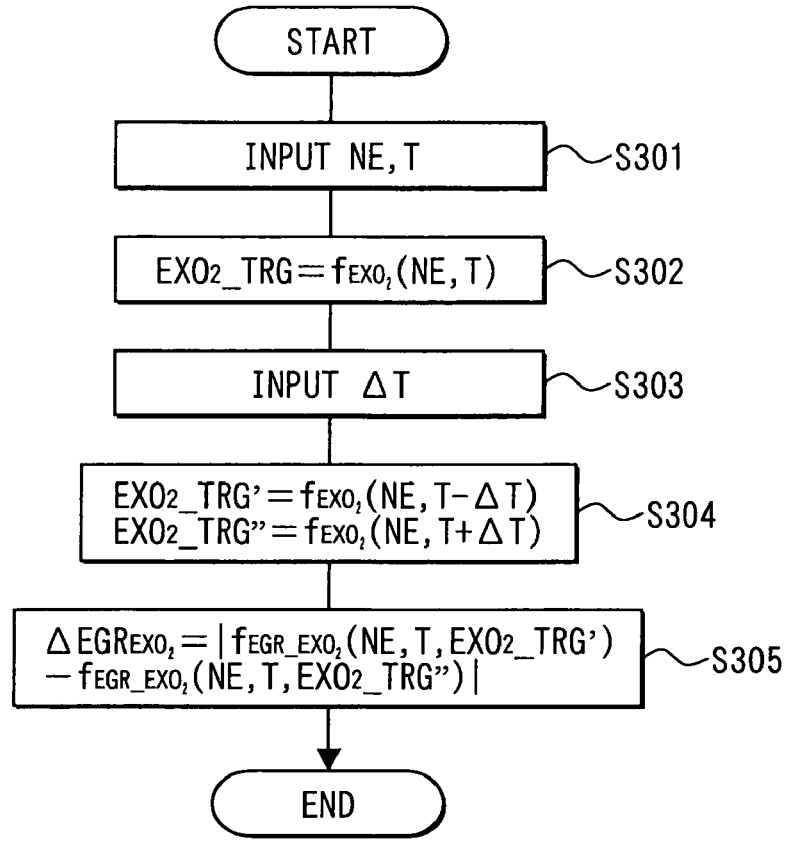
FIG. 9 is a third flowchart for explaining essential part of the control functions.
Figure 10:
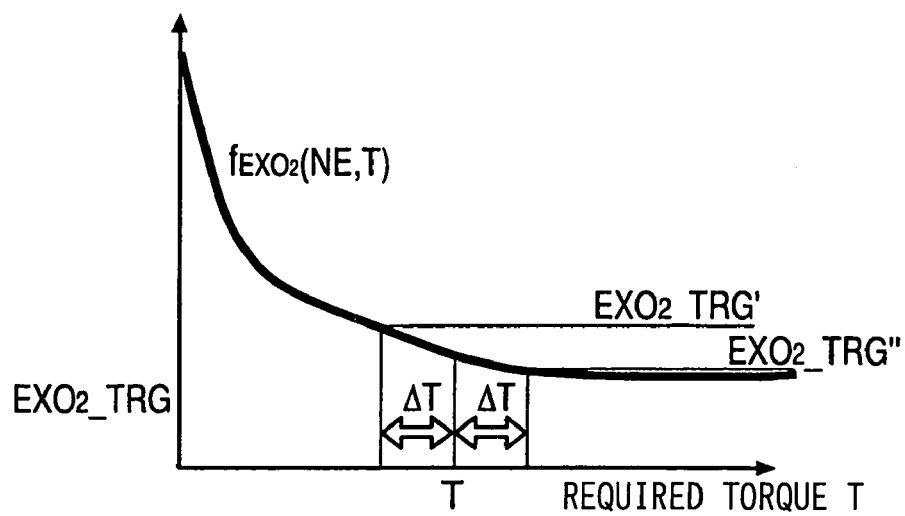
FIG. 10 is a fifth graph for explaining essential part of the control functions.

The procedure executed by a target exhaust oxygen concentration calculating means 523 is shown in FIG. 9. In step S301, the current engine speed NE and required torque T are read. In step S302, an exhaust intake oxygen concentration EXO2_TRG is calculated based on the engine speed NE and the required torque T read in step S301 (Equation 7). The target exhaust oxygen concentration calculated based on the engine speed "ne" and the required torque "t" is represented by fEXO2 (ne, t). The conventional calculation method, such as a map, can be used to calculate. FIG. 10 shows a characteristic of the target exhaust oxygen concentration EXO2_TRG relative to the required torque T.

$$EXO2\_TRG = fEXO2(NE, T) \quad (7)$$

In step S303, the required torque variation $\Delta T$ is read. In step S304, the hypothetical target value calculation means calculates the target exhaust oxygen concentration EXO2_TRG' in case of the engine condition (NE, T−$\Delta T$) and the target exhaust oxygen concentration EXO2_TRG" in case of the engine condition (NE, T+$\Delta T$) (Equation 8-1, 8-2). EXO2_TRG' and EXO2_TRG" are hypothetical target exhaust oxygen concentration when the torque T is changed by ΔT.

$$EXO2\_TRG' = fEXO2(NE, T-\Delta T) \quad (8\text{-}1)$$

$$EXO2\_TRG'' = fEXO2(NE, T+\Delta T) \quad (8\text{-}2)$$

Figure 11:
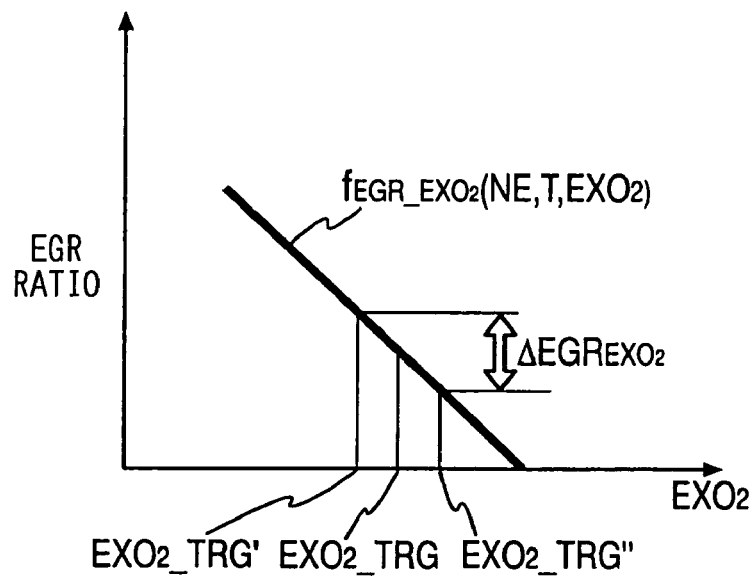
FIG. 11 is a sixth graph for explaining essential part of the control functions.

In step S305, a hypothetical operation amount dispersion calculation means calculates the EGR deviation ΔEGREXO2 (Equation 9). The EGR deviation ΔEGREXO2 is a dispersion of hypothetical EGR ratio when the required torque is varied in a range of ±ΔT with the exhaust oxygen concentration being used as the control parameter for the EGR valve. When the EGR ratio EGREXO2 is calculated based on the engine speed "ne", the required torque "t", and the exhaust oxygen concentration "exo2", it is represented by fEGR_EXO2 (ne, t, exO2). The conventional calculation method, such as a map, can be used to calculate. FIG. 11 shows a characteristic of the EGR ratio EGREXO2 relative to the exhaust oxygen concentration EXO2. After the EGR ratio EGREXO2 is calculated, the routine ends. The target exhaust oxygen concentration EXO2_TRG calculated in step S302 is output to the feedback amount calculation means 54. The EGR deviation ΔEGREXO2 calculated in step S305 is output to the control parameter selecting means 53.

$$\Delta EGREXO2 = |fEGR\_EXO2(NE, T, EXO2\_TRG') - fEGR\_EXO2(NE, T, EXO2\_TRG'')| \quad (9)$$

Figure 12:
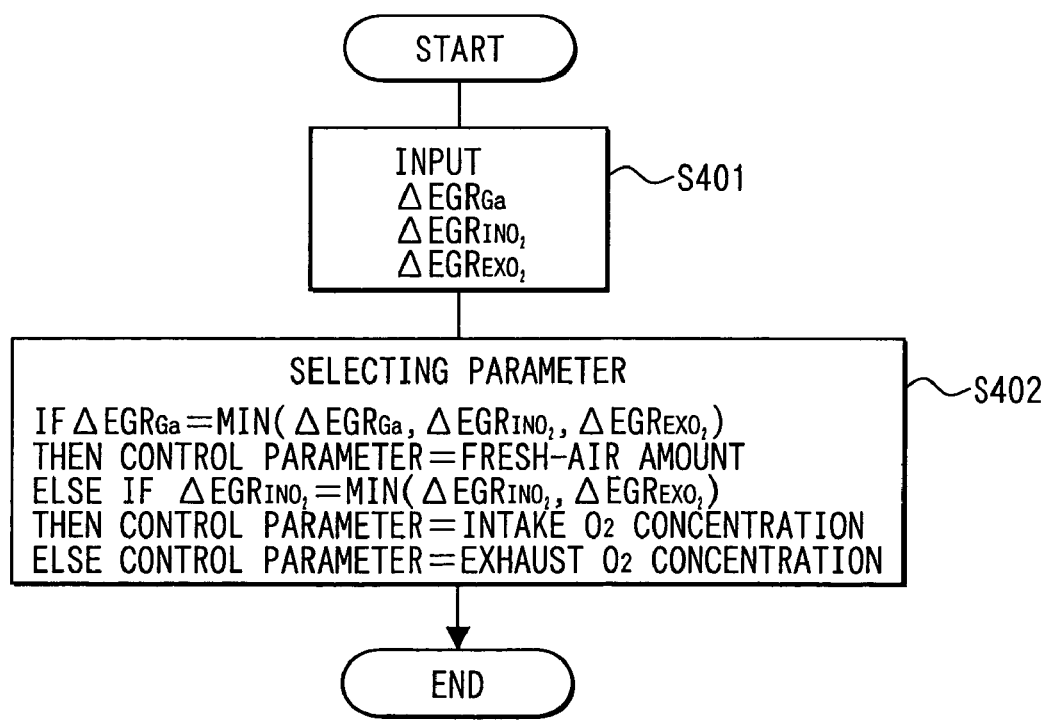
FIG. 12 is a fourth flowchart for explaining essential part of the control functions.

FIG. 12 shows a procedure which is executed by the control parameter selecting means 53. In step S401, the EGR deviations ΔEGRGa, ΔEGRINO2, ΔEGREXO2 are read. In step S402, the control parameter is selected out of the fresh-air amount, the intake oxygen concentration, and the exhaust oxygen concentration. That is, the ECU 5 determines whether the EGR deviation ΔEGRGa is a minimum value among the EGR deviations ΔEGRGa, ΔEGRINO2, ΔEGREXO2. When it is Yes, the control parameter is established by the fresh-air amount. When it is No, it is determined whether the minimum value is the EGR deviation ΔEGRINO2 among the EGR deviations ΔEGRINO2, ΔEGREXO2. When it is Yes, the control parameter is established by the intake oxygen concentration. When it is No, the control parameter is established by the exhaust oxygen concentration. After the control parameter has been established, the routine ends.

Figure 13:
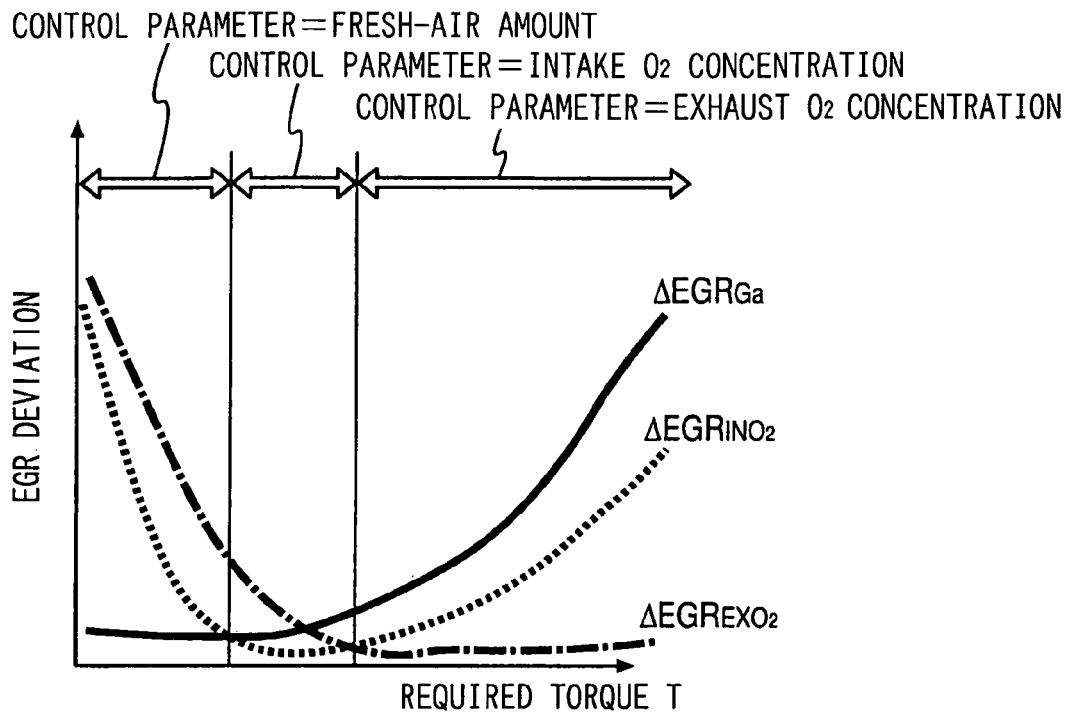
FIG. 13 is a seventh graph for explaining essential part of the control functions.

FIG. 13 shows a characteristic of the EGR deviation relative to the required torque. FIG. 13 shows the control parameter which is selected out of three condition amounts: the fresh-air amount, the intake oxygen concentration, and the exhaust oxygen concentration. The minimum condition amount is selected as the control parameter.

Thereby, even if there is an error between a command value of injected fuel amount corresponding to the required torque and the actual injected fuel amount, the emission due to the error is restrained because, the control of the EGR valve is conducted under the parameter which needs a minimum adjustment of the EGR valve instead of the parameter which needs much adjustment of the EGR valve.

It is considered that the EGR deviations ΔEGRGa, ΔEGRINO2, ΔEGREXO2 are the same as the EGR ratio dispersion caused by the error of fuel injection amount. The EGR deviations are varied according to the variation of the required torque. If the EGR deviation is correctly estimated, the selection of the control parameter is conducted more properly.

A required torque variation calculation means 51 which calculates the required torque variation ΔT is described hereinafter.

Figure 14:
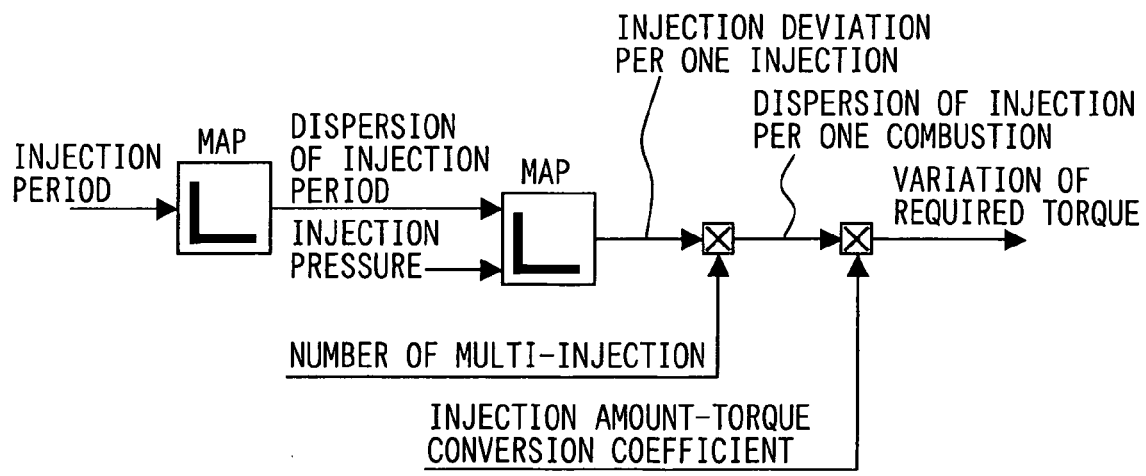
FIG. 14 is a diagram showing an essential part of the control functions.

FIG. 14 shows a procedure which the required torque variation calculation means executes, in which the injection period dispersion is calculated according to an injection period dispersion map, inputting the injection period calculated based on the required torque. The fuel injection amount per single fuel injection is calculated according to the map, inputting the injection period dispersion and the injection pressure. The single injection corresponds to an injection for single opening and closing of the valve. In case of the multi injection, since the deviation of injection amount is accumulated according to the number of injection, the deviation of the injection amount per single injection is multiplied by the number of the injection to obtain the deviation of the injection amount per the power stroke. Then, the deviation of the injection amount is multiplied by a conversion coefficient between the injection amount and the torque to obtain the required torque variation ΔT. As the injection amount increases, the torque increases proportionally. The required torque variation ΔT is calculated according to the engine condition, such as the injection period, the injection pressure, and the number of multi injection. Thus, the proper required torque variation ΔT is obtained.

Figure 15A:
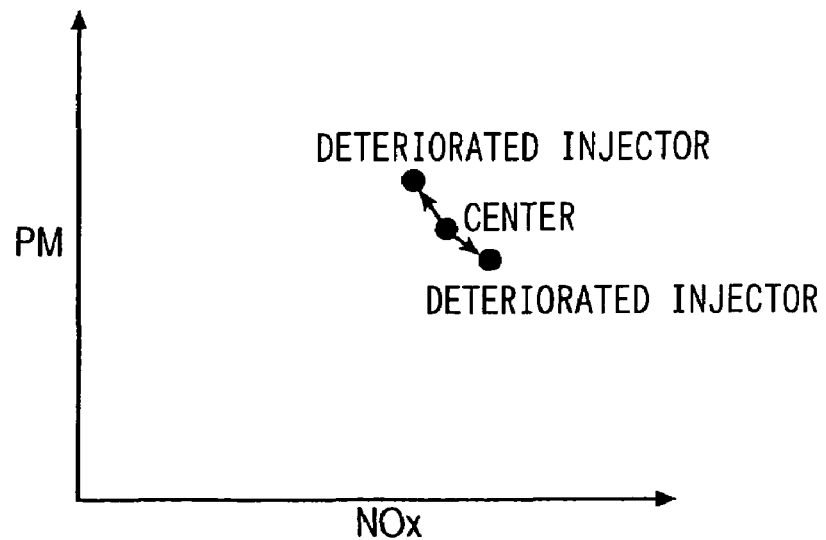
FIG. 15A is a graph for explaining a function of the control apparatus.
Figure 15B:
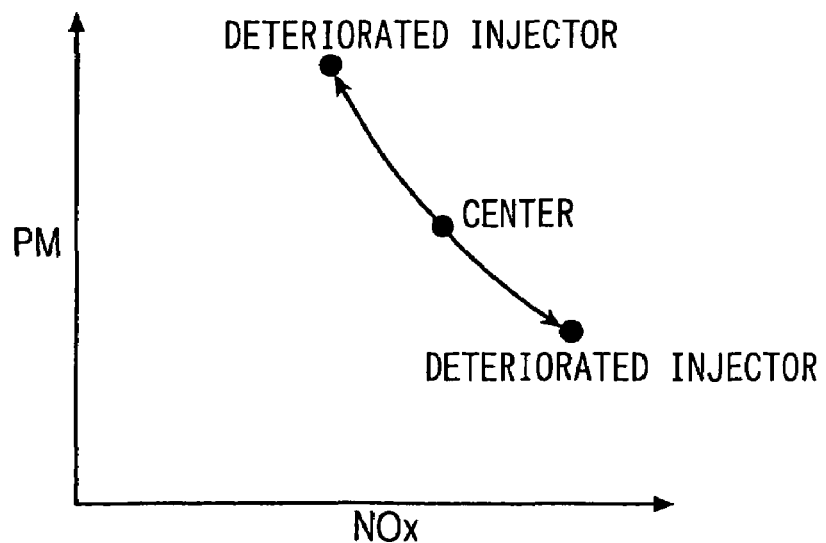
FIG. 15B is a graph for explaining a function of the conventional apparatus.

FIG. 15A and FIG. 15B are graphs for comparing the emission of the control device of the present invention with the emission of the conventional control device in which fresh-air amount is used as the control parameter for controlling the EGR valve 42. Even if the deteriorated injector having operation dispersion is used in the control device, particulate matter (PM) and $NO_x$ are more restrained in the present invention (FIG. 15A) than in the conventional control device (FIG. 15B).

Figure 16:
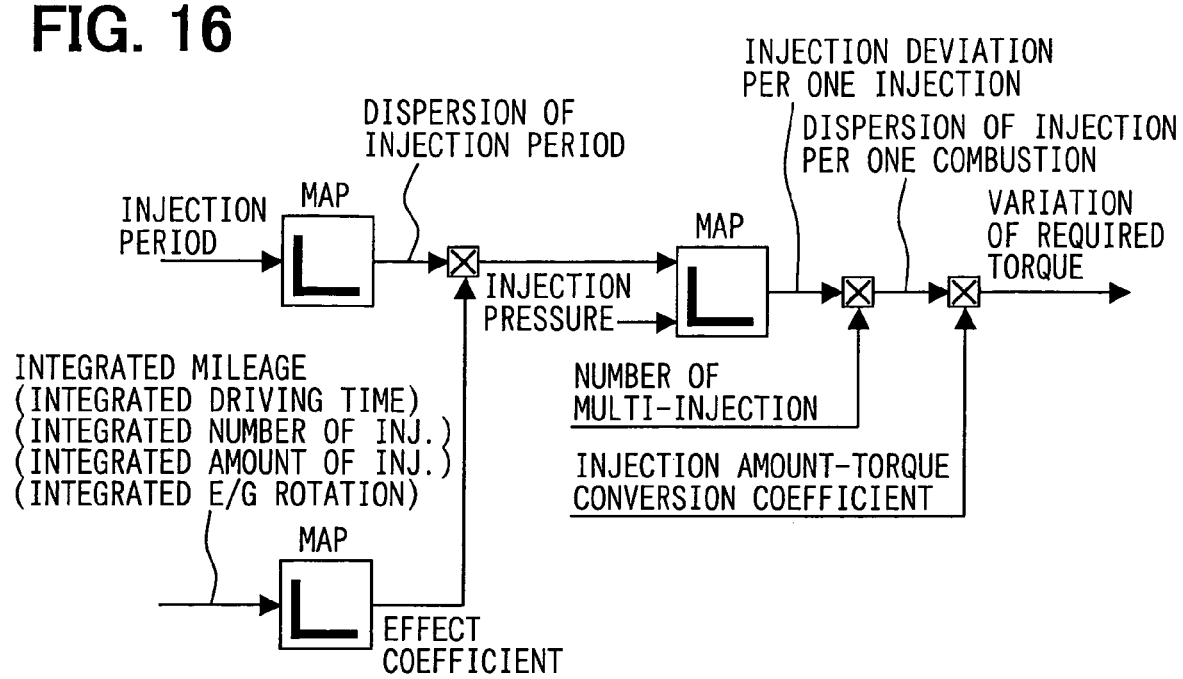
FIG. 16 is a diagram showing a modification of the internal combustion engine according to the present invention.

The error between the injection amount by the command signal and the actual injection amount gradually increases by the deterioration with age of the injectors 21–24. By reflecting the tendency of the error due to the deterioration with age, the required torque variation is obtained more precisely. This example is described in FIG. 16. The required torque variation calculating means is basically the same as one shown in FIG. 14. The main difference is described hereinafter.

An effect coefficient is calculated according to an effect coefficient map, into which an integrated mileage is input. The effect coefficient is a coefficient of relationship between the integrated mileage and the injection period dispersion. By multiplying the injection period dispersion, which is derived from the map, by the effect coefficient, the injection period dispersion of the injectors 21–24 after deteriorated with age can be obtained. The integrated mileage is derived from the ECU controlling a trip meter. The deterioration of the injectors 21–24 advances slowly relative to the engine. Thus, it is unnecessary to receive the signal with respect to the integrated mileage frequently. The signal with respect to the integrated mileage can be received every when the ignition is turned on. The effect coefficient can be updated every predetermined mileage. Thereby, the deviation between the effect coefficient required torque and actual torque obtained by the actual fuel injection can be estimated more precisely.

The effect coefficient map is the map between the integrated mileage and the effect coefficient. An integrated driving period, an integrated number of injections, an integrated injection amount, or an integrated rotational number of engine can be utilized instead of the integrated mileage. These integrated value are variables which increase according to the elapsed time or an operation number of the injectors 21–24.

The character of the condition amount such as the target fresh-air amount relative to the required torque and the character of the EGR ratio relative to the target condition amount are simply changed. Thus, the EGR deviation is defined by the difference of the EGR ratio between the time when the torque is T−ΔT and the time when the torque is T+ΔT. To obtain the EGR ratio more precisely, the difference between the maximum value and the minimum value among more than three points of the torque, for example, T−ΔT, T+ΔT, and T, can be established as the EGR deviation.

Second Embodiment

Figure 17:
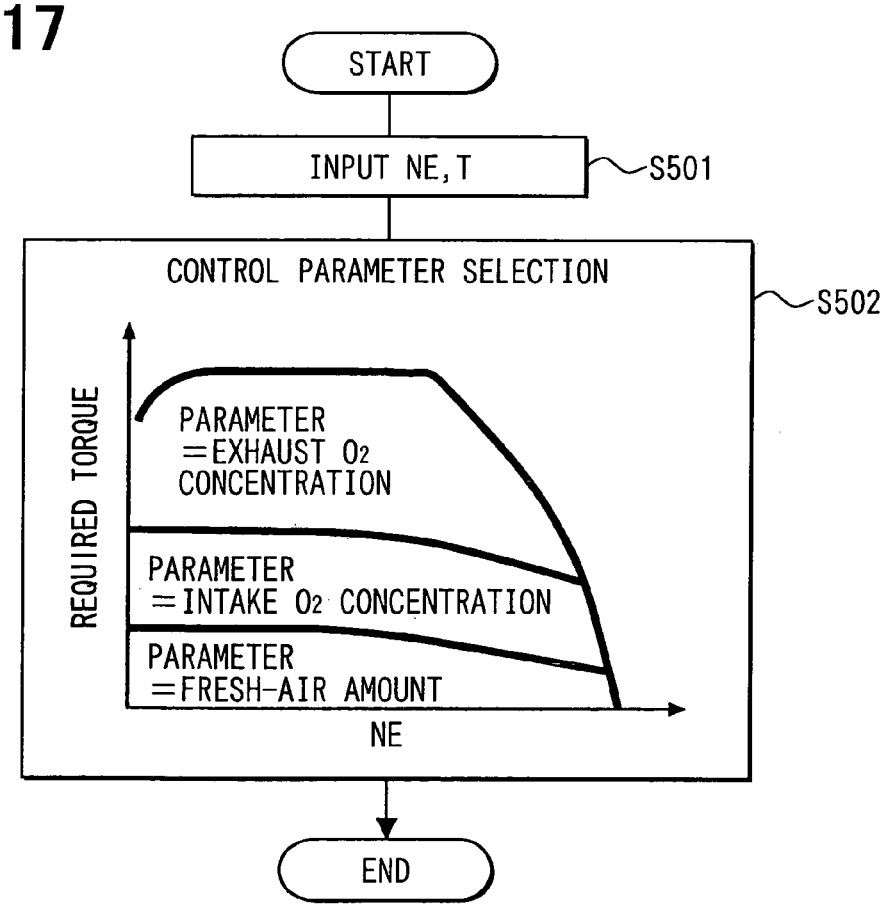
FIG. 17 is a flowchart of the control function executed by the ECU according to the second embodiment of the present invention.

FIG. 17 shows a control procedure of EGR valve executed by the ECU of the internal combustion engine according to a second embodiment. The basic steps are the same as the first embodiment. The different point therebetween is a selecting procedure of the control parameter of the EGR valve control. The main difference is described hereinafter. In step S501, the engine speed NE torque are read. In step S502, the control parameter is selected according to the control parameter-selecting map. Calculating the EGR deviation of the first embodiment with the standard required torque variation ΔT, a control parameter is added to the control parameter-selecting map, the control parameter being selected out of the fresh-air amount, intake oxide concentration, and the exhaust oxygen concentration, of which the EGR deviation is minimum.

According to the present embodiment, it is needless to calculate and compare the EGR deviation in selecting the control parameter, so that the calculating load can be reduced.

Figure 18:
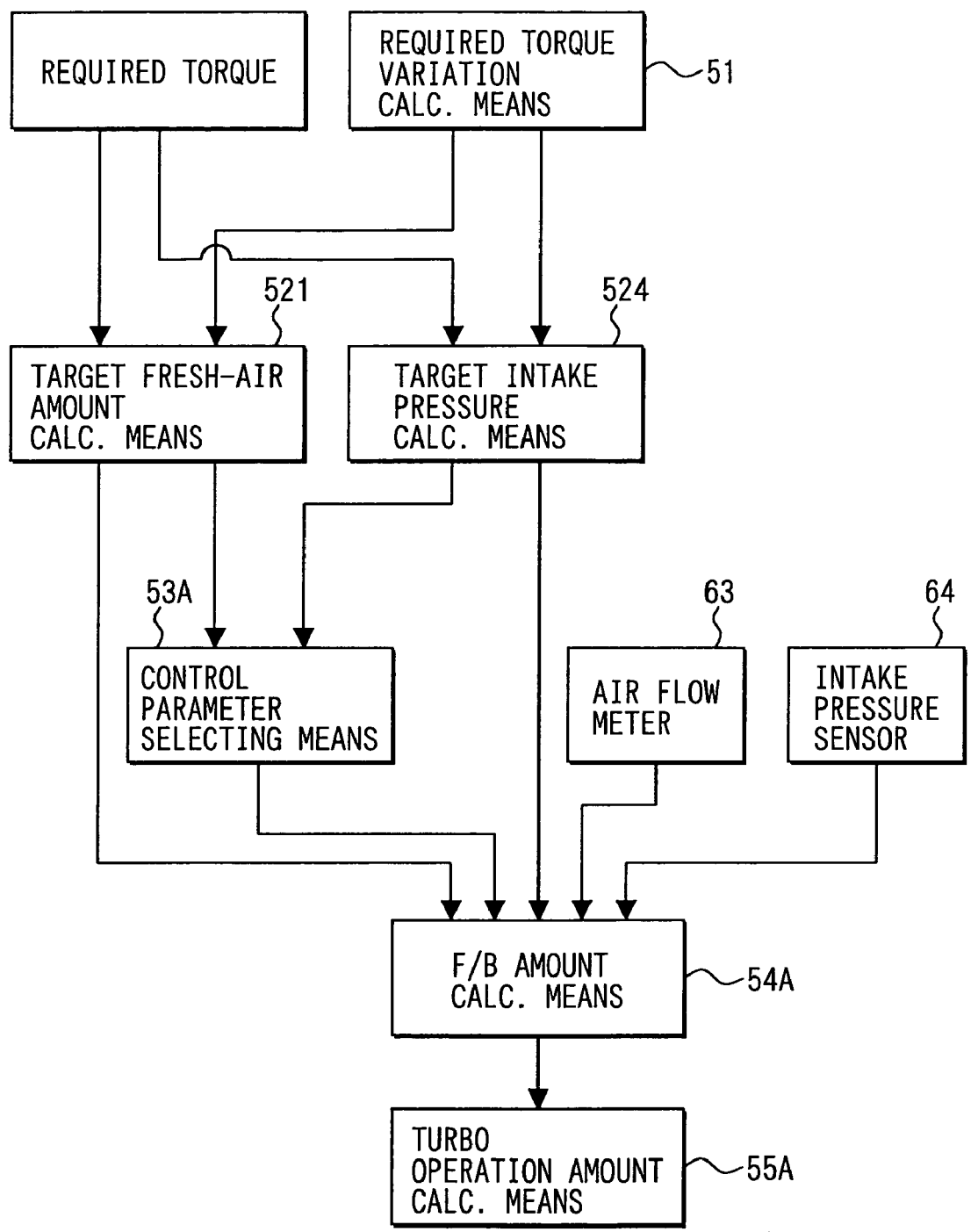
FIG. 18 is a diagram showing other modification according to the present invention.
Figure 19:
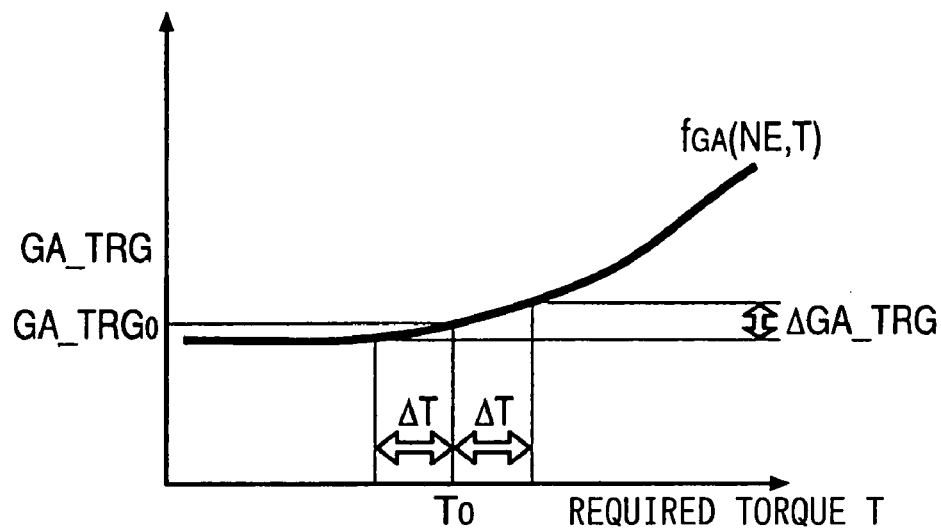
FIG. 19 is a first graph for explaining a conventional internal combustion engine.
Figure 20:
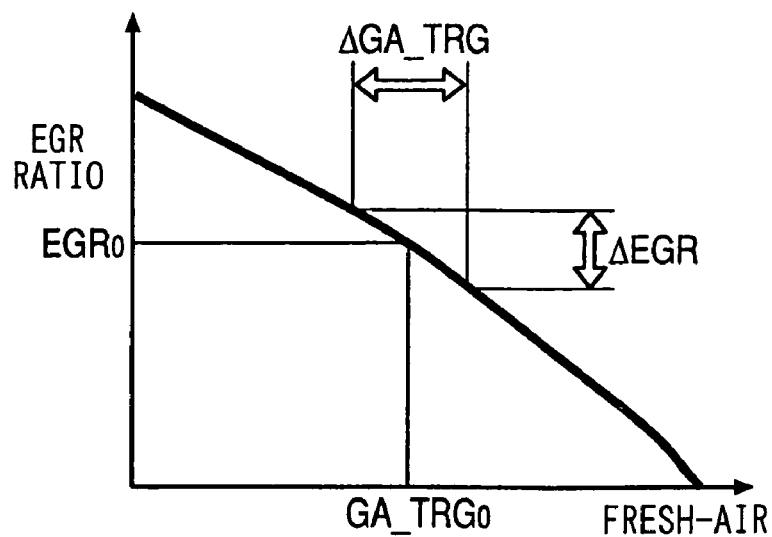
FIG. 20 is a second graph for explaining a conventional internal combustion engine.

The construction of the present invention is not limited to the aforementioned embodiments, and any other modified embodiments can be obtained. For example, the condition amount selected as the control parameter of the EGR valve 42 is not limited only to three of the fresh-air amount, the intake oxygen concentration and the exhaust oxygen concentration but also two of them. The condition amounts which are changeable according to the EGR ratio can be added to or replaced by the aforementioned condition amount. The gas adjusting means is not limited to the EGR valve. FIG. 18 shows a routine in which a variable turbo 43 is provided as the gas adjusting means. The control parameter is one of the fresh-air amount, the intake pressure detected by the intake air pressure sensor 64. A feedback amount calculation means 54A calculates the feedback amount of condition amount of the variable turbo 43 in such a manner that the detected value corresponds to the target value. The target value includes a target fresh-air amount and the target intake pressure. The target intake pressure is calculated by a target intake pressure calculating means 524 based on the engine speed NE, the required torque T, and the required torque variation ΔT. The control parameter selecting means 53A selects one of the fresh-air and the intake pressure as the control parameter. The control parameter selecting means selects one of which the deviation of the operation amount of variable turbo 43 is smaller as well as the first embodiment.

A variable valve timing controller which controls opening and closing timing of intake and exhaust valves, or an exhaust throttle valve can be used as the gas adjusting means. These devices can adjust the amount and composition of the gas which produces the mixed air with the injected fuel.

The condition amount as the control parameter for controlling the gas adjusting means is a condition amount which changes according to the operation amount of the gas adjusting means. The intake air amount, the EGR ratio, or the engine condition can be used, which can be estimated according to a predetermined model.

What is claimed is:

1. A control device for an internal combustion engine, comprising:
  a gas adjusting means for adjusting a gas which makes a mixture gas with an injected fuel;
  a gas adjust depending condition amount detecting means for detecting a condition amount indicating an engine condition which varies according to an operation amount of the gas adjusting means; and
  a gas adjust controlling means for conducting a gas adjust control in which an operation amount of the gas adjusting means is established in such a manner that the detected condition amount is turned to a target value which is established with respect to a current control condition including a required torque, wherein
  the gas adjust depending condition amount detecting means includes a plurality of gas adjust depending condition amount detecting means which detect different kinds of condition amounts,
  the gas adjust controlling means changes the gas adjust control based on one of the different kinds of condition amounts into the gas adjust control based on another of the other different kinds of condition amounts;
  the gas adjust controlling means executes the gas adjust control based on the condition amount in which a deviation of operation amount of the gas adjusting means is a minimum when the control condition is varied in a range including a current control condition.

2. The control device for an internal combustion engine according to claim 1, wherein
  the gas adjust controlling means includes a hypothetical target value calculating means which calculates a hypothetical target value of the condition amount based on a predetermined range including the current control condition, a hypothetical operation amount deviation calculating means which calculates a deviation of hypothetical operation amount of the gas adjusting means relative to a hypothetical target value, and a selecting means which selects the gas adjusting control based on a condition amount of which deviation of operation amount is minimum.

3. The control device for an internal combustion engine according to claim 2, further comprising:
  a predetermined range setting means which sets a predetermined range based on one of the control condition and the engine condition.

4. The control device for an internal combustion engine according to claim 1, wherein
  the gas adjust controlling means memorizes a relationship between the control condition and kinds of condition amounts, and executes the gas adjusting control based on the condition amount corresponding to the current control condition.

5. The control device for an internal combustion engine according to claim 1, wherein the gas adjust controlling means executes the gas adjust control based on a fresh-air amount as the condition amount when the required torque is small, and executes the gas adjust control based on an exhaust oxygen concentration as the condition amount when the required torque is large.

6. The control device for an internal combustion engine according to claim 1, wherein the gas adjusting means comprises one from the group including: is an exhaust gas recirculation valve and a variable turbo.

7. A control device for an internal combustion engine, comprising:
  a gas adjusting means for adjusting a gas which makes a mixture gas with an injected fuel;
  a gas adjust depending condition amount detecting means for detecting a condition amount indicating an engine condition which varies according to an operation amount of the gas adjusting means; and
  a gas adjust controlling means for conducting a gas adjust control in which an operation amount of the gas adjusting means is established in such a manner that the detected condition amount is turned to a target value which is established with respect to a current control condition including a required torque, wherein
  the gas adjust depending condition amount detecting means includes a plurality of gas adjust depending condition amount detecting means which detect different kinds of condition amounts,
  the gas adjust controlling means changes the gas adjust control based on one of the different kinds of condition amounts into the gas adjust control based on another of the different kinds of condition amounts; and
  the gas adjust controlling means executes the gas control based on the condition amount in which the deviation of operation amount of the gas adjusting means is minimized.

8. The control device for an internal combustion engine according to claim 1, wherein the condition amount indicating an engine condition includes one or more of: amount of fresh air, intake oxygen concentration, and exhaust oxygen concentration.

9. The control device for an internal combustion engine according to claim 1, wherein the gas adjust controlling means executes the gas adjust control based on a fresh-air amount as the condition amount when the required torque is small, executes the gas adjust control based on an intake oxygen concentration as the condition when the required torque is large, and executes the gas adjust control based on an exhaust oxygen concentration as the condition amount when the required torque is even larger.

10. The control device for an internal combustion engine according to claim 1, wherein the gas adjust controlling means executes the gas adjust control based on an intake oxygen concentration as the condition when the required torque is small, and executes the gas adjust control based on an exhaust oxygen concentration as the condition amount when the required torque is large.

* * * * *